United States Patent
Won et al.

(10) Patent No.: US 9,423,023 B2
(45) Date of Patent: Aug. 23, 2016

(54) APPARATUS AND METHOD FOR PROTECTING DRIVE SHAFT

(71) Applicants: Hyundai Motor Company, Seoul (KR); Kia Motors Corporation, Seoul (KR)

(72) Inventors: Chan Hee Won, Seoul (KR); Tae Young Park, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 14/823,218

(22) Filed: Aug. 11, 2015

(65) Prior Publication Data

US 2016/0169380 A1 Jun. 16, 2016

(30) Foreign Application Priority Data

Dec. 11, 2014 (KR) .................. 10-2014-0178538

(51) Int. Cl.

| | |
|---|---|
| *F16H 59/58* | (2006.01) |
| *F16H 61/12* | (2010.01) |
| *G01B 7/30* | (2006.01) |
| *G01L 3/10* | (2006.01) |
| *G01M 13/02* | (2006.01) |
| *F02D 41/02* | (2006.01) |
| *F02D 41/04* | (2006.01) |

(52) U.S. Cl.
CPC ............ *F16H 61/12* (2013.01); *F02D 41/0225* (2013.01); *F02D 41/045* (2013.01); *F16H 59/58* (2013.01); *G01B 7/30* (2013.01); *G01L 3/10* (2013.01); *G01M 13/021* (2013.01); *F16H 2061/124* (2013.01)

(58) Field of Classification Search
None
See application file for complete search history.

(56) References Cited

U.S. PATENT DOCUMENTS

| | | | |
|---|---|---|---|
| 2009/0271069 A1 | 10/2009 | Yamamoto et al. | |
| 2012/0143455 A1* | 6/2012 | Lee | B60K 28/10 701/84 |
| 2013/0060436 A1* | 3/2013 | Cousins | F16H 59/44 701/64 |
| 2013/0110362 A1 | 5/2013 | Hong | |

FOREIGN PATENT DOCUMENTS

| | | |
|---|---|---|
| KR | 10-2012-0033835 A | 4/2012 |
| KR | 10-2014-0022230 A | 2/2014 |
| KR | 10-2014-0080301 A | 6/2014 |

* cited by examiner

*Primary Examiner* — Justin Holmes
(74) *Attorney, Agent, or Firm* — Morgan, Lewis & Bockius LLP

(57) ABSTRACT

A drive shaft protection apparatus may include a Revolutions Per Minute RPM) detection device configured to detect an RPM of an engine and of a turbine, a gear-shifting detection device configured to detect a lever position of a transmission, a steering-angle detection device configured to detect a steering angle, an accelerator pedal position detection device configured to detect a displacement of an accelerator pedal, an engine-torque detection device configured to detect an engine torque of a vehicle, a loss-torque detection device configured to detect loss torque of the vehicle, and a controller configured to change a limit torque based on a bending angle of a drive shaft upon receiving the steering angle, and variably perform engine torque reduction control in a manner that torque applied to the drive shaft does not exceed the limit torque in response to output signals of the respective detection device.

10 Claims, 3 Drawing Sheets

APPARATUS AND METHOD FOR PROTECTING DRIVE SHAFT

CROSS-REFERENCE TO RELATED APPLICATION

The present application claims priority to Korean patent application No. 10-2014-0178538 filed Dec. 11, 2014, the entire contents of which is incorporated herein for all purposes by this reference.

BACKGROUND OF THE INVENTION

1. Field of the Invention

Various aspects of the present invention relate to an apparatus and method for protecting a drive shaft of a vehicle, and more particularly to a technology for variably reducing engine torque in consideration of a steering angle so as to employ maximum torque optimized for drive shaft characteristics.

2. Description of Related Art

Generally, a steering wheel, a steering gear box, a step bar, a knuckle, a lower arm, and wheels are mounted on a chassis device through a connection device. A drive shaft, which is connected with a bendable joint to transfer output signals of an engine and a transmission, interlocks with the transmission and the chassis device.

The drive shaft is a device for transferring power generated from a powertrain to wheels, joints are respectively provided at a transmission and wheels, and a ball joint is mounted to the wheels so that power transmission can be achieved by reflecting a bending angle for steering into the wheels.

As a result, when the drive shaft is broken or damaged, it is impossible to transmit driving force to wheels, so that a powertrain may be broken or damaged.

In case of using a conventional vehicle, under the condition that a reverse gear is selected, if a steering angle is higher than a predetermined steering angle or if an engine Revolutions Per Minute (RPM) is higher than a predetermined RPM, the conventional vehicle is designed to reduce engine torque using the predetermined values.

However, the conventional vehicle is designed to uniformly reduce torque on the basis of a specific condition having the highest steering angle. Therefore, much more torque is reduced than necessary reference torque until protection logic is released. Therefore, if insufficient torque occurs in an uphill (ascent) parking condition of the reverse (R)-gear mode, vehicle gradability may be deteriorated, i.e., a vehicle may fail to park on the uphill road at the R-gear mode.

In addition, the conventional vehicle does not have torque calculation logics. Thus, although vehicles have the same model and the same engine, if the vehicles have different gear ratios, the vehicles must be re-tested to reconfigure the amount of engine torque reduction, so that serious losses may occur during production task.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an apparatus and method for protecting a drive shaft that substantially obviate one or more problems due to limitations and disadvantages of the related art.

Various aspects of the present invention are additionally directed to providing a technology for variably reducing an engine torque in consideration of a steering angle, so that the technology can use maximum torque optimized for drive shaft characteristics within a threshold torque (limit torque) applied to a drive shaft.

According to various aspects of the present invention, a drive shaft protection apparatus may include a Revolutions Per Minute (RPM) detection device configured to detect an RPM of an engine and of a turbine, a gear-shifting detection device configured to detect a lever position of a transmission, a steering-angle detection device configured to detect a steering angle, an accelerator pedal position detection device configured to detect a displacement of an accelerator pedal, an engine-torque detection device configured to detect an engine torque of a vehicle, a loss-torque detection device configured to detect loss torque of the vehicle, and a controller configured to change a limit torque based on a bending angle of a drive shaft upon receiving the steering angle, and variably perform engine torque reduction control in a manner that torque applied to the drive shaft does not exceed the limit torque in response to output signals of the respective detection devices.

The controller, under a condition that an output signal of the gear-shifting detection device indicates a drive (D)-gear position or a reverse (R)-gear position, may be configured to perform variable engine torque reduction control when the RPM received from the RPM detection device, the steering angle received from the steering-angle detection device, the accelerator pedal position received from the accelerator pedal position detection device, and the engine torque received from the engine-torque detection device are higher than respective reference values.

The controller may be configured to detect a transmission gear ratio received from the gear-shifting detection device and a final gear ratio (FGR).

The controller may be configured to determine a torque amplification rate by detecting the engine RPM and the turbine RPM.

The controller may be configured to perform the engine torque reduction control in response to at least one detection signal of a gear ratio, a final gear ratio (FGR), and a loss torque.

According to various aspects of the present invention, a drive shaft protection method may include detecting, by a controller, a Revolutions Per Minute (RPM) of an engine and turbine, detecting, by the controller, a lever position of a transmission, detecting, by the controller, a steering angle, detecting, by the controller, a displacement of an accelerator pedal, determining, by the controller, a limit torque based on a bending angle of a drive shaft, as a variable value, in consideration of the steering angle, determining, by the controller, whether the engine torque is higher than the limit torque by detecting an engine torque of a vehicle, detecting, by the controller, a loss torque of the vehicle, and variably performing, by the controller, engine torque reduction control in a manner that torque applied to the drive shaft does not exceed the limit torque in response to the respective detection signals.

The drive shaft protection method may further include under a condition that the transmission is at a drive (D)-gear position or a reverse (R)-gear position, performing, by the controller, the engine torque reduction control when the RPM, the steering angle, the accelerator pedal position, and the engine torque are higher than respective reference values.

The detecting of the lever position of the transmission may include detecting a gear ratio of the transmission and a final gear ratio (FGR).

The detecting of the engine and the turbine RPM may include determining a torque amplification rate by detecting the engine RPM and the turbine RPM.

The performing of the engine torque reduction control may include variably performing the engine torque reduction control in response to at least one detection signal of a gear ratio, a final gear ratio (FGR), and a loss torque.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
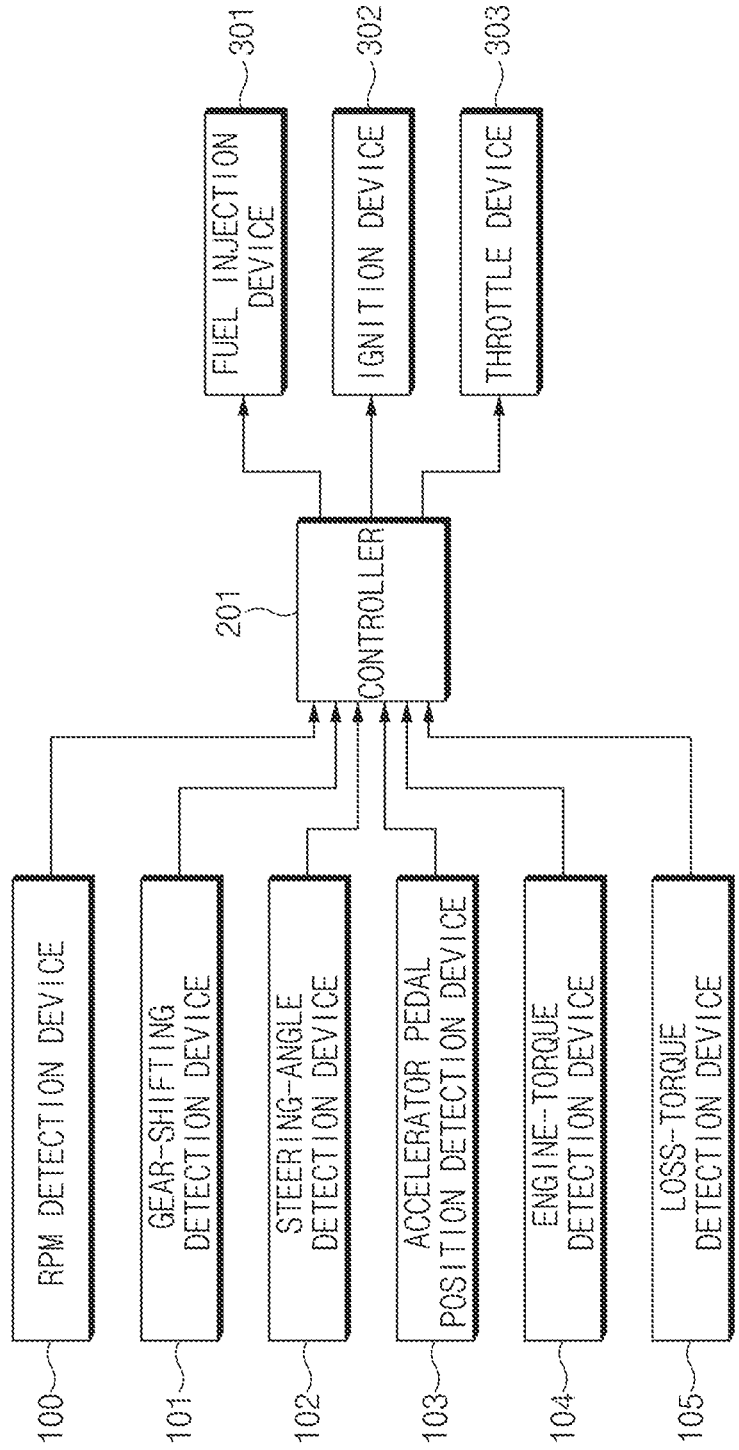
FIG. 1 is a block diagram illustrating an exemplary drive shaft protection apparatus according to the present invention.

FIG. 1 is a block diagram illustrating a drive shaft protection apparatus according to various embodiments of the present invention.

Referring to FIG. 1, the drive shaft protection apparatus according to various embodiments of the present invention may include a revolutions per minute (RPM) detection device 100, a gear-shifting detection device 101, a steering-angle detection device 102, an accelerator pedal position detection device 103, an engine-torque detection device 104, a loss-torque detection device 105, a controller 201, a fuel-injection device 301, an ignition device 302 and throttle device 303.

In this case, the rotation-speed detection device 100 may detect revolutions per minute (RPM) of an engine or turbine, and may output the detected RPM to the controller 201.

The gear-shifting detection device 101 may detect a gear selected by a driver who holds a shift lever, and provide information regarding the selected gear to the controller 201. Here, an inhibitor switch connected to the shift lever through a cable may be applied to the gear-shifting detection device 101.

The steering-angle detection device 102 may detect a steering angle of the steering wheel, convert information regarding the detected steering angle into an electrical signal, and output the electrical signal to the controller 201.

In addition, the accelerator pedal position detection device 103 may detect a displacement of an accelerator pedal operated by a vehicle driver, convert information regarding the detected displacement into an electrical signal, and output the electrical signal to the controller 201.

In addition, the engine-torque detection device 104 may detect drive torque of a vehicle engine, and output the detected drive torque to the controller 201. The loss-torque detection device 105 may detect loss torque of a vehicle, and output the detected loss torque to the controller 201.

In addition, the controller 201 may variably perform engine torque reduction control, upon receiving various signals from the RPM detection device 100, the gear-shifting detection device 101, the steering-angle detection device 102, the accelerator pedal position detection device 103, the engine-torque detection device 104, and the loss-torque detection device 105.

For example, the controller 201 may determine whether the RPM of the engine or turbine is higher than a predetermined RPM. The controller 201 may determine whether information regarding the shift-lever position received from the gear-shifting detection device 101 is a parking position (P-gear) or a neutral position (N-gear).

In addition, the controller 201 may determine whether the steering angle information received from the steering-angle detection device 102 is higher than a predetermined angle. The controller 201 may determine whether the accelerator-pedal position information received from the accelerator pedal position detection device 103 is greater than a predetermined displacement value.

The controller 201 may determine whether the engine torque value detected by the engine-torque detection device 104 is higher than a predetermined torque value. The controller 201 may determine whether the loss torque detected by the loss-torque detection device 105 is higher than a predetermined limit torque.

If the above-mentioned decision values are higher than a reference value, the controller 201 may calculate a limit torque (i.e., threshold torque) on the basis of the bending angle of a drive shaft in response to a state of the steering angle. The controller 201 may detect a gear ratio of a current transmission and a final gear ratio (FGR) in response to gear shift information received from the gear-shifting detection device 101.

The controller 201 may receive an engine RPM and a turbine RPM from the RPM detection device 100, and thus calculate a torque amplification rate on the basis of the received RPM information.

The controller 201 calculates a limit engine torque at which torque applied to the drive shaft does not exceed a limit value, and performs torque reduction control using the limit engine torque. In this case, the controller 201 may perform engine corporation control in consideration of a gear ratio of a transmission, a final gear ratio, and torque amplification rate, and loss torque in such a manner that torque applied to the drive shaft does not exceed the limit torque.

On the other hand, the controller 201 may determine whether the RPM detected by the RPM detection device 100 is equal to or lower than a predetermined RPM, may determine whether the transmission lever-position information received from the gear-shifting detection device 101 is at a park position (P-gear) or a neutral position (N-gear), or may determine whether the steering angle information received from the steering-angle detection device 102 is equal to or less than a predetermined angle.

The controller 201 receives a displacement of the accelerator pedal from the accelerator pedal position detection device 103. If the received displacement of the accelerator pedal is equal to or less than a reference value, or if engine torque detected by the engine-torque detection device 104 is equal to or less than a limit torque, the controller 201 may release the engine torque reduction control.

For example, the controller 201 may calculate the limit engine torque using the following equation 1.

$$\text{Limit engine torque} = \frac{\text{drive} - \text{shaft limit torque variable}}{(\text{final gear ratio}) \times (\text{current shift gear ratio}) \times} - \text{loss torque} \quad [\text{Equation 1}]$$
$$(\text{torque amplification rate of torque converter})$$

In Equation 1, the drive-shaft limit torque variable may be changed according to a steering angle of the steering wheel.

In addition, the fuel injection device 301 may adjust the amount of fuel injected into a combustion chamber upon receiving a control signal from the controller 201, resulting in engine torque reduction.

The ignition device 302 may adjust an ignition time upon receiving a control signal from the controller 201, resulting in engine torque reduction. The throttle device 303 may adjust a throttle valve-opening.

Figure 2:
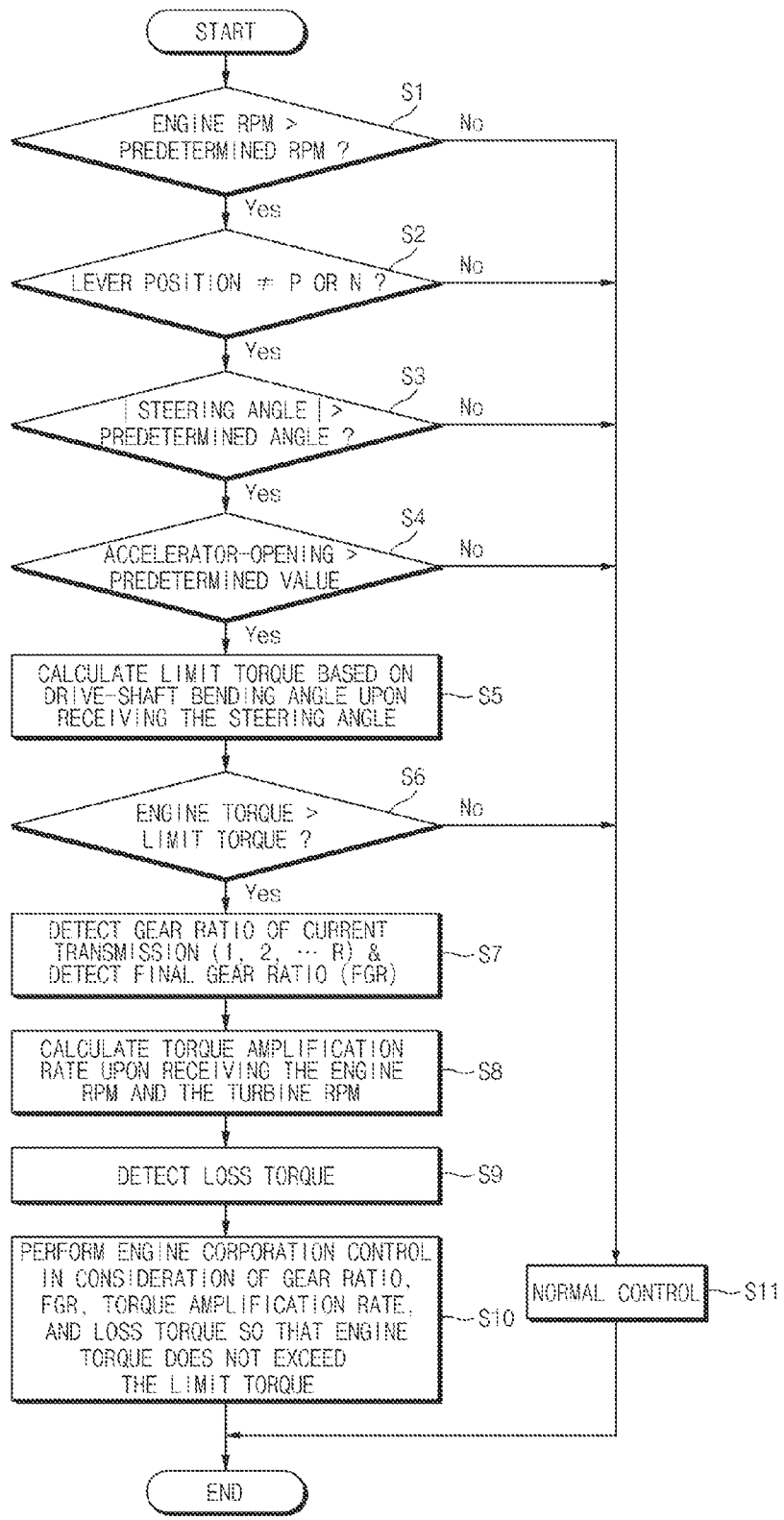
FIG. 2 is a flowchart illustrating an exemplary drive shaft protection method according to the present invention.

FIG. 2 is a flowchart illustrating a drive shaft protection method according to an embodiment of the present invention. A method for controlling the drive shaft protection apparatus according to various embodiments of the present invention will hereinafter be described with reference to FIG. 2.

Referring to FIG. 2, during vehicle traveling, the controller 201 may determine whether the engine or turbine RPM received from the RPM detection device 100 is higher than a predetermined RPM in step S1.

Thereafter, if the RPM is higher than the predetermined RPM, the controller 201 detects transmission lever-position information received from the gear-shifting detection device 101, and determines whether the detected lever position is a parking or neutral position in step S2. In this case, the controller 201 may perform normal control when the lever position of the transmission is a parking position (P-gear) or a neutral position (N-gear), and then detect whether the lever position is a drive-gear (D-gear) position or a reverse gear (R-gear) position.

Thereafter, if a transmission is at the D-gear position or R-gear position in step S2, the controller 201 may detect whether steering angle information received from the steering angle detection device 102 is higher than a predetermined angle in step S3.

Subsequently, if the steering angle is higher than the predetermined angle in step S3, the controller 201 may detect the accelerator pedal displacement received from the accelerator pedal position detection device 103 in step S4. That is, the controller 201 may determine whether the opening degree of the accelerator pedal is greater than a predetermined reference value.

If the opening degree of the accelerator pedal is greater than the predetermined reference value in step S4, the controller 201 receives the steering angle information from the steering-angle detection device 102, and thus calculates a limit torque on the basis of the bending angle of the drive shaft in step S5.

Thereafter, in step S6, the controller 201 may determine whether engine torque detected by the engine-torque detection device 104 is higher than a limit torque calculated in step S5.

After that, the controller 201 may detect a gear ratio of a current transmission and a final gear ratio (FGR) in response to gear shift information received from the gear-shifting detection device 101.

The controller 201 may detect a gear ratio of a current transmission and the FGR in response to the gear shift information received from the gear-shifting detection device 101 in step S7.

The controller 201 may calculate a torque amplification rate in response to the engine or turbine RPM received from the RPM detection device 100 in step S8. The controller 201 may detect loss torque received from the loss-torque detection device 105 in step S9.

Thereafter, the controller 201 may calculate the limit engine torque in consideration of a limit torque variable of the drive shaft, a gear ratio, a final gear ratio (FGR), a torque amplification rate, and loss torque in such a manner that torque applied to the drive shaft does not exceed the limit torque in step S10.

The controller 201 may determine whether torque applied to the drive shaft does not exceed the limit torque. If the engine torque does not exceed the limit torque, the controller 201 performs torque reduction control using the fuel injection device 301 and the ignition device 302 so that current engine torque tracks the calculated limit engine torque.

That is, if torque applied to the drive shaft exceeds the limit torque, the controller 201 may reduce the engine torque. The controller 201 performs torque reduction control in response to the steering angle of a vehicle. If impact is applied to the drive shaft, the controller 201 reduces the engine torque so that it can prevent the drive shaft from being damaged.

If the engine or turbine RPM is less than a predetermined RPM in step S1, if the lever position is at a park position (P-gear) or a neutral position (N-gear) in step S2, if the steering angle is less than a predetermined angle in step S3, if the accelerator opening is less than a reference value in step S4, or if the engine torque is less than the limit torque, the controller 201 releases engine torque reduction control and then performs normal control in step S11.

Figure 3:
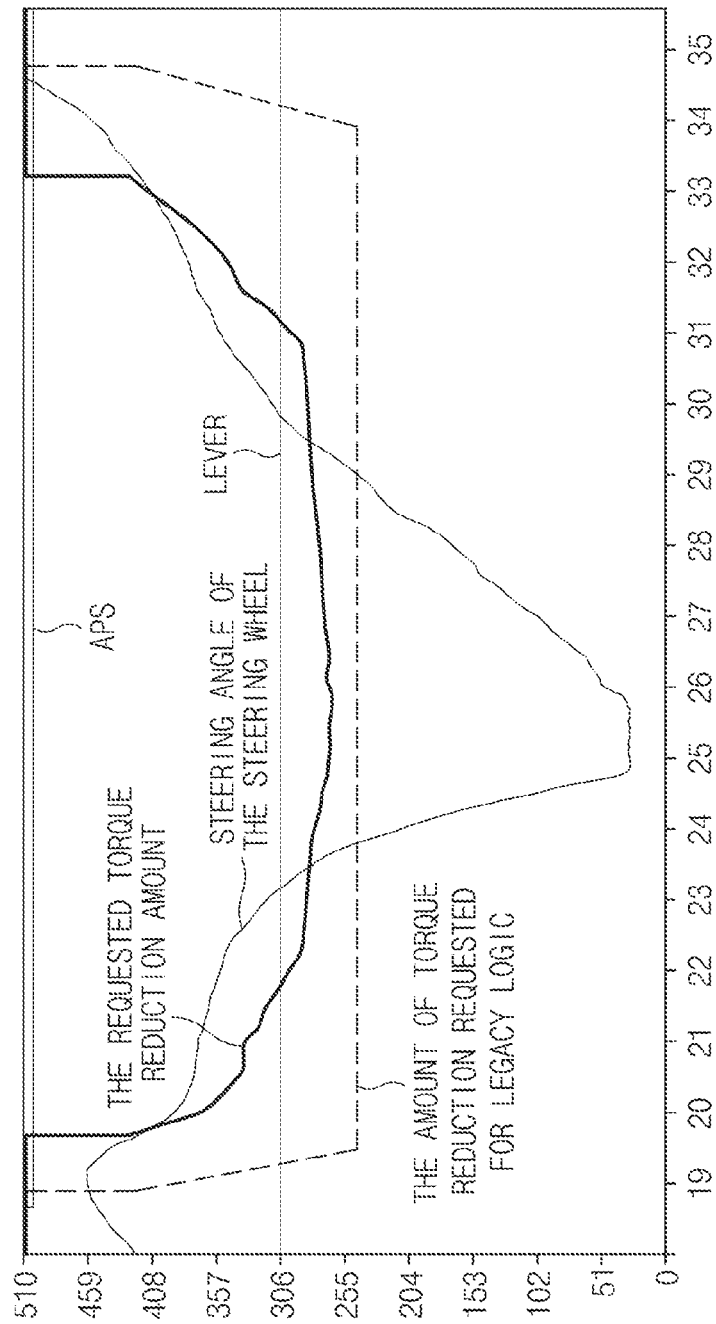
FIG. 3 is a graph illustrating actual vehicle data of the drive shaft protection apparatus according to the present invention.

FIG. 3 is a graph illustrating vehicle data of the drive shaft protection apparatus according to various embodiments of the present invention.

Referring to FIG. 3, the drive shaft protection apparatus according to various embodiments receives the steering angle, and configures the limit torque value of the drive shaft in response to the bending angle of the drive shaft. The engine torque reduction control is variably executed in response to the configured limit torque value, so that the drive shaft protection apparatus can use maximum torque optimized for drive shaft characteristics.

The above-mentioned embodiments can directly use a maximum torque setting value in response to the steering angle. As a result, when the torque reduction value setting is performed, there is no need to repeatedly test a vehicle including the drive shaft protection apparatus in various conditions (e.g., D-gear condition, R-gear condition, each sales area).

That is, the various embodiments can consider a safety factor only using breaking torque input and can also implement front loading through initial prearranged planning. In addition, the drive shaft is downsized so that production costs of the vehicle can be greatly reduced.

As is apparent from the above description, the apparatus and method for protecting a drive shaft of a vehicle according to the present invention variably control engine torque reduction in consideration of a steering angle, thereby employing maximum torque within a limit torque of the drive shaft.

The apparatus for protecting a drive shaft of a vehicle according to the present invention includes torque calculation logics, so that it can properly cope with a changed gear ratio of a transmission without retesting, ROM management task and task inefficiency caused by vehicle retesting can be minimized.

In addition, the drive shaft can be downsized so that production costs of the vehicle are reduced, fuel efficiency (mileage), acceleration performance, and steering performance can be improved.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A drive shaft protection apparatus comprising:
    a Revolutions Per Minute (RPM) detection device configured to detect an RPM of an engine and of a turbine;
    a gear-shifting detection device configured to detect a lever position of a transmission;
    a steering-angle detection device configured to detect a steering angle;
    an accelerator pedal position detection device configured to detect a displacement of an accelerator pedal;
    an engine-torque detection device configured to detect an engine torque of a vehicle;
    a loss-torque detection device configured to detect loss torque of the vehicle; and
    a controller configured to change a limit torque based on a bending angle of a drive shaft upon receiving the steering angle, and variably perform engine torque reduction control in a manner that torque applied to the drive shaft does not exceed the limit torque in response to output signals of the respective detection devices.

2. The drive shaft protection apparatus according to claim 1, wherein the controller, under a condition that an output signal of the gear-shifting detection device indicates a drive (D)-gear position or a reverse (R)-gear position, is configured to perform variable engine torque reduction control when the RPM received from the RPM detection device, the steering angle received from the steering-angle detection device, the accelerator pedal position received from the accelerator pedal position detection device, and the engine torque received from the engine-torque detection device are higher than respective reference values.

3. The drive shaft protection apparatus according to claim 1, wherein the controller is configured to detect a transmission gear ratio received from the gear-shifting detection device and a final gear ratio (FGR).

4. The drive shaft protection apparatus according to claim 1, wherein the controller is configured to determine a torque amplification rate by detecting the engine RPM and the turbine RPM.

5. The drive shaft protection apparatus according to claim 1, wherein the controller is configured to perform the engine torque reduction control in response to at least one detection signal of a gear ratio, a final gear ratio (FGR), and a loss torque.

6. A drive shaft protection method comprising:
    detecting, by a controller, a Revolutions Per Minute (RPM) of an engine and turbine;
    detecting, by the controller, a lever position of a transmission;
    detecting, by the controller, a steering angle;
    detecting, by the controller, a displacement of an accelerator pedal;
    determining, by the controller, a limit torque based on a bending angle of a drive shaft, as a variable value, in consideration of the steering angle;
    determining, by the controller, whether the engine torque is higher than the limit torque by detecting an engine torque of a vehicle;
    detecting, by the controller, a loss torque of the vehicle; and
    variably performing, by the controller, engine torque reduction control in a manner that torque applied to the drive shaft does not exceed the limit torque in response to the respective detection signals.

7. The drive shaft protection method according to claim 6, further comprising:
    under a condition that the transmission is at a drive (D)-gear position or a reverse (R)-gear position, performing, by the controller, the engine torque reduction control when the RPM, the steering angle, the accelerator pedal position, and the engine torque are higher than respective reference values.

8. The drive shaft protection method according to claim 6, wherein the detecting of the lever position of the transmission includes:
    detecting a gear ratio of the transmission and a final gear ratio (FGR).

9. The drive shaft protection method according to claim 6, wherein the detecting of the engine and the turbine RPM includes:
    determining a torque amplification rate by detecting the engine RPM and the turbine RPM.

10. The drive shaft protection method according to claim 6, wherein the performing of the engine torque reduction control includes:
    variably performing the engine torque reduction control in response to at least one detection signal of a gear ratio, a final gear ratio (FGR), and a loss torque.

* * * * *